United States Patent
Lin et al.

(10) Patent No.: US 8,654,546 B2
(45) Date of Patent: Feb. 18, 2014

(54) METHOD AND APPARATUS FOR CONTROLLING RESONANT POWER CONVERTER

(75) Inventors: Tien-Chi Lin, New Taipei (TW); Hang-Seok Choi, Bedford, NH (US); Ta-Yung Yang, Milpitas, CA (US)

(73) Assignee: System General Corp., New Taipei (TW)

( * ) Notice: Subject to any disclaimer, the term of this patent is extended or adjusted under 35 U.S.C. 154(b) by 140 days.

(21) Appl. No.: 13/425,422

(22) Filed: Mar. 21, 2012

(65) Prior Publication Data

US 2012/0281434 A1 Nov. 8, 2012

Related U.S. Application Data

(60) Provisional application No. 61/481,346, filed on May 2, 2011.

(51) Int. Cl.
*H02M 3/335* (2006.01)

(52) U.S. Cl.
USPC .......... 363/21.02; 363/21.03; 363/21.12; 363/21.15; 363/21.17; 363/21.18; 363/24; 363/25; 363/26

(58) Field of Classification Search
USPC .......... 363/21.02, 21.03, 21.12, 21.15, 21.17, 363/21.18, 24, 25, 26
See application file for complete search history.

(56) References Cited

U.S. PATENT DOCUMENTS

| | | | |
|---|---|---|---|
| 2010/0182804 A1* | 7/2010 | Yang | 363/21.02 |
| 2010/0277955 A1* | 11/2010 | Duan et al. | 363/21.02 |
| 2010/0296319 A1* | 11/2010 | Liu | 363/21.12 |
| 2010/0315841 A1* | 12/2010 | Saji | 363/21.12 |
| 2010/0328967 A1* | 12/2010 | Cody et al. | 363/21.02 |
| 2010/0328969 A1* | 12/2010 | Meyer | 363/21.03 |
| 2011/0261594 A1* | 10/2011 | Joshi | 363/21.12 |
| 2012/0299503 A1* | 11/2012 | Aharon | 315/224 |

\* cited by examiner

*Primary Examiner* — Bao Q Vu
(74) *Attorney, Agent, or Firm* — Jianq Chyun IP Office

(57) ABSTRACT

A control circuit of a resonant power converter is disclosed. The control circuit comprises a first transistor and a second transistor for switching a transformer and a resonant tank comprising a capacitor and an inductor. A controller is configured to receive a feedback signal correlated to the output of the power converter for generating a first switching signal and a second switching signal to drive the first transistor and the second transistor, respectively. A diode coupled to the first transistor and the resonant tank for detecting the state of the first transistor and generating a detection signal for the controller. The detection signal indicates if the transistors are in a zero voltage switching (ZVS) state. If the transistors are not in the ZVS state, the switching frequency of the transistors will be increased.

16 Claims, 8 Drawing Sheets

METHOD AND APPARATUS FOR CONTROLLING RESONANT POWER CONVERTER

CROSS-REFERENCE TO RELATED APPLICATION

This application claims the priority benefits of U.S. provisional application Ser. No. 61/481,346, filed on May 2, 2011. The entirety of the above-mentioned patent application is hereby incorporated by reference herein and made a part of this specification.

BACKGROUND OF THE INVENTION

1. Field of the Invention

The present invention relates to resonant power converters, and particularly relates to a control circuits for resonant power converters.

2. Background of the Invention

For achieving higher efficiency, a resonant power converter should operate at a frequency closely to the resonant frequency of the resonant power converter with a full load and/or with a low input voltage. However, when the switching frequency decreases in response to increase of the load and/or decrease of the input voltage of the power converter, the switching frequency might fall into a zero current switching (ZCS) region (that is, region 3 shown in FIG. 2). If the switching frequency decreases and falls into region 3, the resonant power converter would operate at a none-linear area. Besides, the none-ZVS (non-zero voltage switching) operation will cause overheat in switching power devices and generate noises. Therefore, preventing the resonant power converter from operating in region 3 in FIG. 2 is required.

SUMMARY OF THE INVENTION

The present invention provides a control circuit of a resonant power converter. The control circuit comprises a first transistor and a second transistor for switching a transformer and a resonant tank. A controller is configured to receive a feedback signal, correlated to the output of the resonant power converter, for generating a first switching signal and a second switching signal to drive the first transistor and the second transistor respectively. A diode coupled to the first transistor detects the state of the first transistor and generates a detection signal for the controller corresponding to the state of the first transistor, wherein the switching frequency of the first transistor and the second transistor is increased if a body diode of the first transistor is not conducted before the first switching signal turns on the first transistor.

In other words, the present invention provides a method for controlling a resonant power converter. The method comprises the following steps: receiving a feedback signal; generating a switching signal corresponding to the feedback signal; switching on a transformer and a resonant tank through a transistor corresponding to the switching signal; generating a detection signal indicating whether the body diode of the transistor is conducted or not before switching on the transformer and the resonant tank through the transistor; and changing the switching frequency of the transistor corresponding to the detection signal, wherein the transistor is driven by the switching signal, and the feedback signal is correlated to the output of the power converter.

DETAILED DESCRIPTION OF EMBODIMENTS

Figure 1:
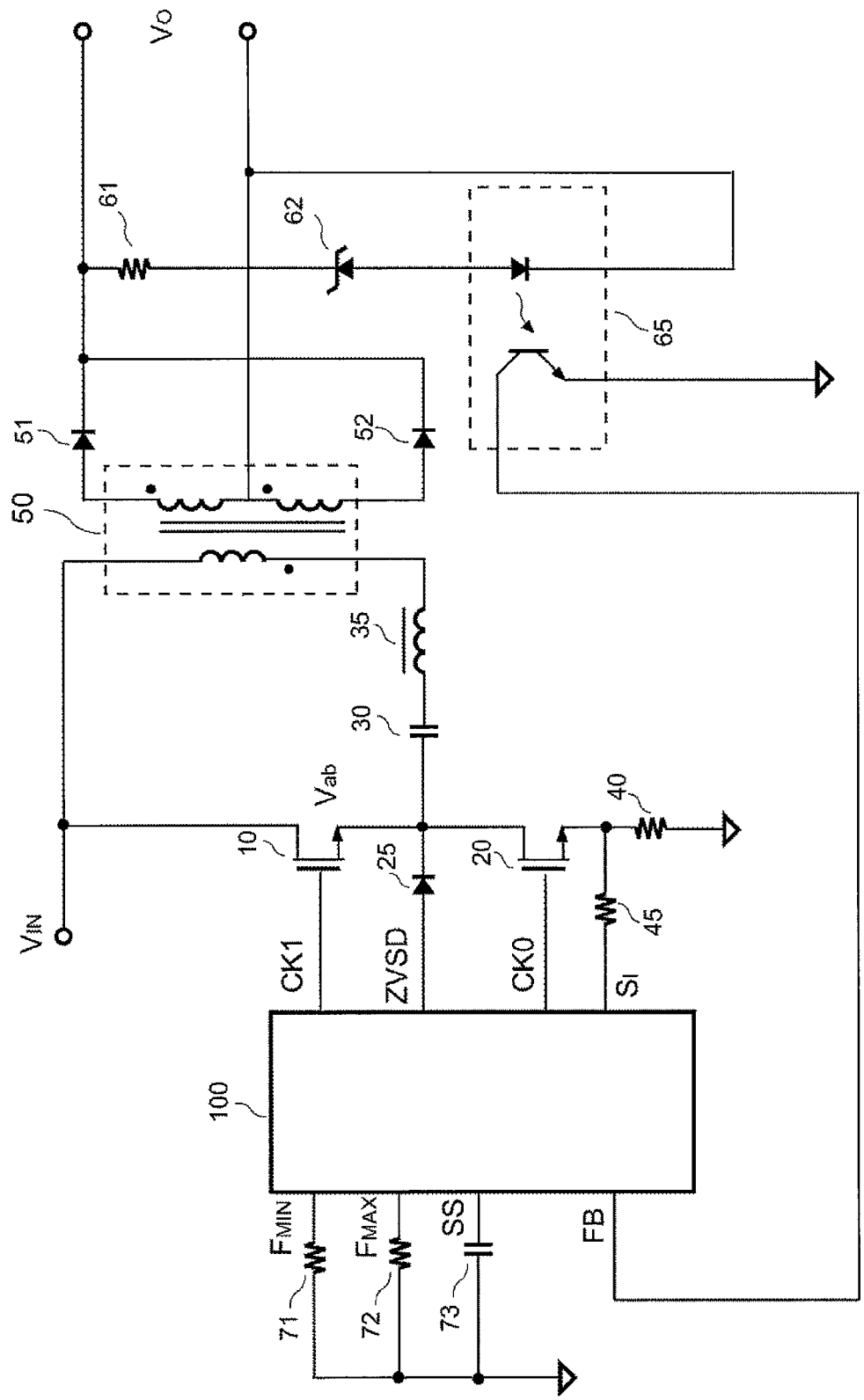
FIG. 1 shows a schematic view illustrating one embodiment of a resonant power converter according to the present invention.

FIG. 1 shows a schematic view illustrating one embodiment of a resonant power converter according to the present invention. The resonant power converter comprises a controller 100, transistors 10 and 20, and a resonant tank. The controller 100 is coupled to the transistors 10 and 20 through terminals CK1 and CK0, respectively. Switching signals CK0 and CK1 are generated by the controller 100 to turn on transistors 20 and 10 in response to a feedback signal $V_{FB}$ at a feedback terminal FB of the controller 100. The source of the transistor 10 and the drain of the transistor 20 are coupled to a resonant tank for switching the resonant tank and a transformer 50. The drain of the transistor 10 receives an input $V_{IN}$. $V_{ab}$ is a voltage shown on the drain of the transistor 20. The resonant tank comprises a capacitor 30 and an inductor 35. A diode 25 is connected to the drain terminal of the transistor 20 for detecting a ZVS (zero voltage switching) state of the transistor 20 and generating a ZVS-detection signal ZVSD coupled to the controller 100. A resistor 40 is utilized to detect the switching current of the transistor 20, and a signal $S_I$ is generated on a resistor 45 and sent to the controller 100. The resistor 40 is connected between the source of the transistor 20 and a ground, and the resistor 45 is connected between the source of the transistor 20 and the controller 100. Rectifiers 51 and 52 are connected to the secondary winding of the transformer 50 for generating the output Vo of the power converter. A feedback circuit comprises a resistor 61, a zener diode 62 and an opto-coupler 65 and generates the feedback signal $V_{FB}$ at the feedback terminal FB in accordance with the output $V_O$. The controller 100 further comprises a $F_{MIN}$ terminal coupled to a resistor 71 for determining a minimum switching frequency, a $F_{MAX}$ terminal coupled to a resistor 72 for determining a maximum switching frequency, and an SS terminal coupled to a capacitor 73 for soft starting.

Figure 2:
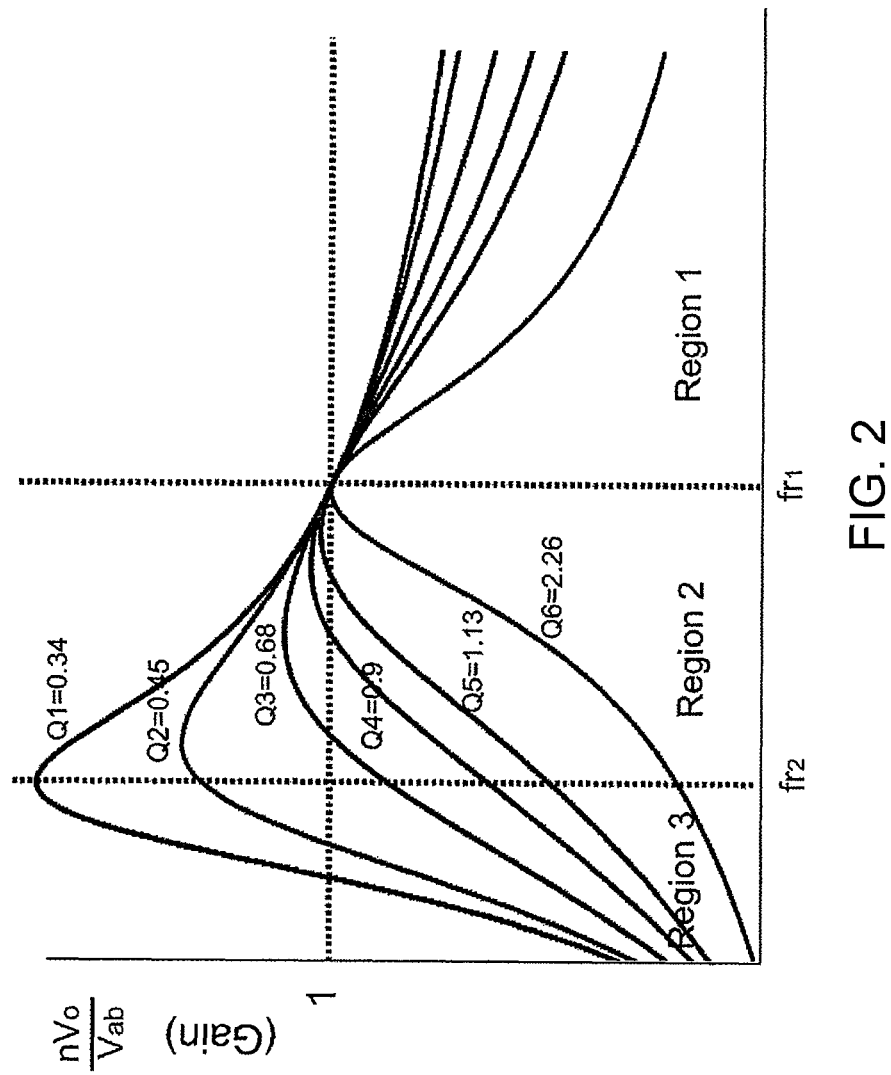
FIG. 2 shows the transfer function of a resonant tank of the resonant power converter.

FIG. 2 shows the transfer function of the resonant tank of the resonant power converter, in which $F_{r1}$ ($\omega_{r1}$) is a resonant frequency of the resonant tank. The inductance $L_r$ is the equivalent inductance of the resonant tank, it is mostly determined by the inductor 35. The capacitance $C_r$ is equivalent capacitance of the resonant tank; it is decided by the capacitance of the capacitor 30. The inductance $L_m$ is the magnetizing inductance of the primary winding of the transformer 50. The inductance $L_m$ associated with the inductance $L_r$ and the capacitance $C_r$ determines another resonant frequency $F_{r2}$ ($\omega_{r2}$) of the resonant tank. The equations for calculating the resonant frequencies $F_{r1}$ and $F_{r2}$ are described in following equations (1) and (2):

$$F_{r1}(\omega_{r1}) = (\sqrt{L_r C_r})^{-1} \quad (1)$$

$$F_{r2}(\omega_{r2}) = (\sqrt{(L_r + L_m) C_r})^{-1} \quad (2)$$

"Region 1" of FIG. 2 is defined as that the operation frequency of the resonant power converter is higher than a first resonant frequency $F_{r1}$. "Region 2" of FIG. 2 is defined as that the operation frequency is higher than a second resonant frequency $F_{r2}$, and is lower than the first resonant frequency $F_{r1}$. If the impedance of the resonant tank results in the operation frequency of the resonant tank falling into Region 1 and Region 2, the switching of transistors 10 and 20 can be "zero-voltage-switching (ZVS)". "Region 3" is defined as that the operation frequency of the resonant power converter is lower than the resonant frequency $F_{r2}$. If the operation frequency of the resonant tank falls into Region 3, switching of transistors 10 and 20 cannot achieve ZVS condition. In FIG. 2, a horizontal axis represents frequency domain, and a vertical axis represents a value that the output $V_O$ divided by $V_{ab}$ and timing n, and also represents a gain value of the output. $V_{ab}$ is a voltage shown on the drain of the transistor 20, and n represents turns of the transformer 50. In this illustrating example, n is a constant value. Different curves in FIG. 2 represent "$nV_O/V_{ab}$" values of different quality factors, that is known as "Q" value. The following discussion focuses on any single Q value curve shown in FIG. 2. It is clearly shown that for the feedback loop control of the resonant power converter, the output voltage V0 increases in response to the decrease of the switching frequency operating in Region 1 and Region 2. However, the output voltage $V_O$ decreases in response to the decrease of the switching frequency operating in Region 3. Therefore, the switching frequency of the resonant power converter should be avoided to operate in Region 3. The advantage of the resonant power converter is, the maximum power transfer and the maximum efficiency can be achieved when the switching frequency operates at the resonant frequency. Therefore, the present invention allows the switching frequency of the resonant power converter operate closely to the resonant frequency and not fall into Region 3 of FIG. 2.

Figure 3:
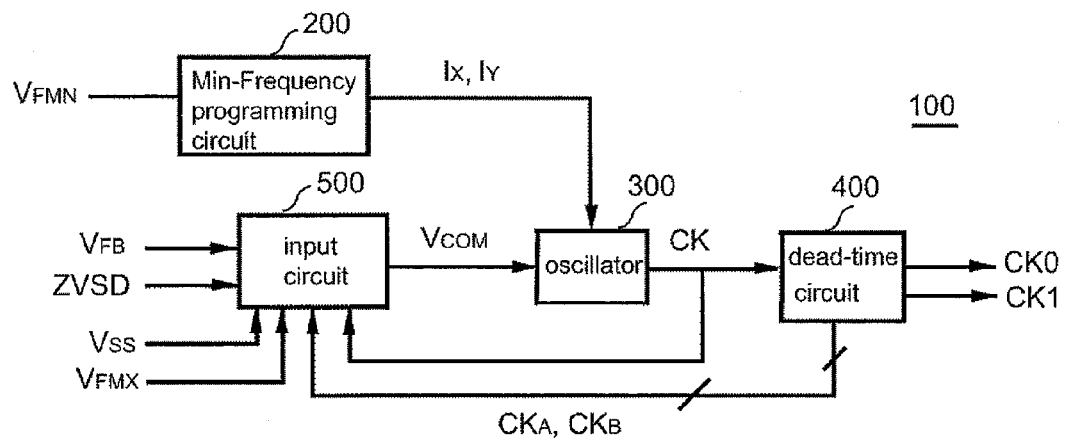
FIG. 3 shows a block diagram illustrating one embodiment of the controller according to the present invention.

FIG. 3 shows a block diagram illustrating one possible embodiment of the controller 100 according to the present invention. The controller 100 includes a minimum-frequency programming circuit 200 (represented as min-freq. programming circuit), an oscillator 300, an input circuit 500 and a dead-time circuit 400. Referring to FIGS. 1 and 3, the minimum-frequency programming circuit 200 generates currents $I_X$ and $I_Y$ in accordance with the resistor 71 through the terminal $F_{MIN}$, and the details will be described in FIG. 4. The currents $I_X$ and $I_Y$ are coupled to the oscillator 300 generating an oscillation signal CK in accordance with the currents $I_X$, $I_Y$ and a control signal $V_{COM}$. The control signal $V_{COM}$ is generated by the input circuit 500 according to the feedback signal $V_{FB}$ received at the feedback terminal FB, the ZVS-detection signal ZVSD, a soft-start signal $V_{SS}$ received at the SS terminal and a maximum-frequency signal $V_{FMX}$ received at the VFMX terminal. The oscillation signal CK is further configured to generate the switching signals CK0 and CK1 through a dead-time circuit 400.

Figure 4:
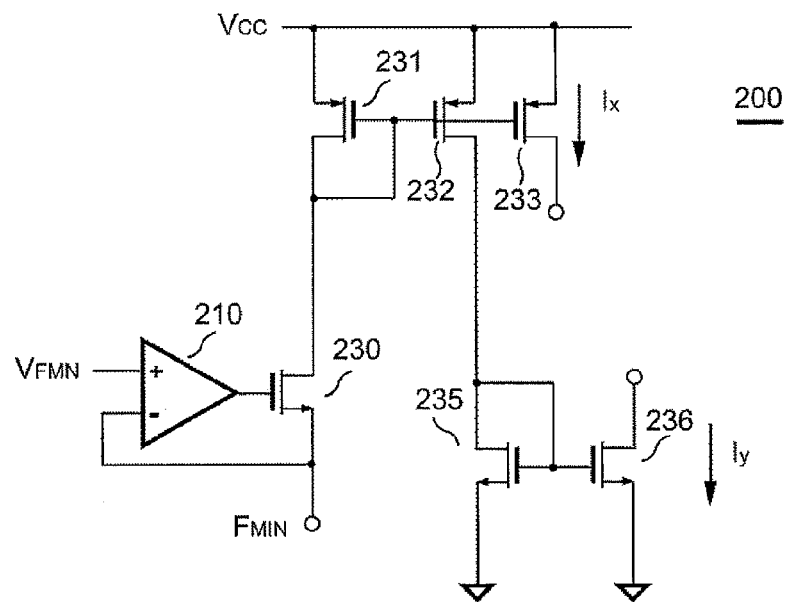
FIG. 4 shows a schematic diagram illustrating one embodiment of the minimum-frequency programming circuit according to the present application.

FIG. 4 shows a schematic diagram illustrating one possible embodiment of the minimum-frequency programming circuit 200 according to the present application. The minimum-frequency programming circuit 200 comprises a comparator 210, and transistors 230, 231, 232, 233, 235 and 236. The resistor 71 of FIG. 1 is connected to the $F_{MIN}$ terminal, and a signal $V_{FMX}$ determines values of the currents $I_X$ and $I_Y$.

Figure 5:
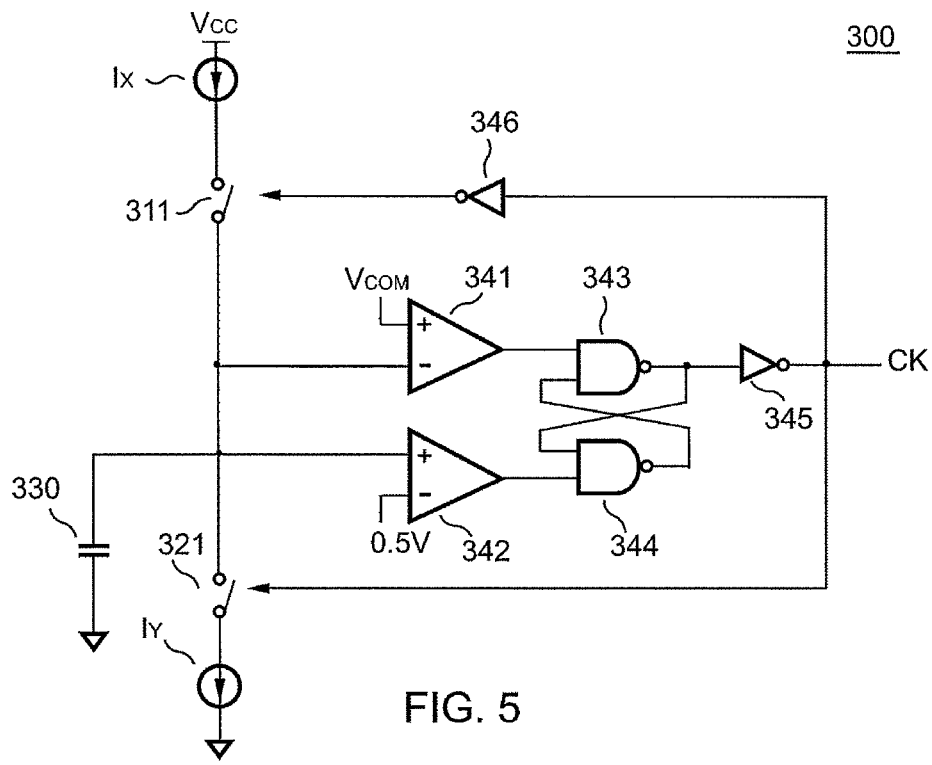
FIG. 5 shows a schematic diagram illustrating one embodiment of the oscillator according to the present application.

FIG. 5 shows a schematic circuit illustrating one embodiment of the oscillator 300 according to the present application. The oscillator 300 comprises comparators 341 and 342, NAND gates 343 and 344, inverters 345 and 346, switches 311 and 321, and a capacitor 330. The control signal $Y_{COM}$ operates as a trip-point voltage of the oscillator 300 that is illustrated as a voltage controlled oscillator (VCO) for purpose of explaining. The currents $I_X$ and $I_Y$ are illustrated as current sources in FIG. 5. Switches 311 and 321 are coupled to the $I_X$ current source and the $I_Y$ current source respectively. The signal $V_{COM}$ is coupled to a positive terminal of the comparator 341. The negative terminal of comparator 341 and the positive terminal of the comparator 342 are coupled to the capacitor 330. The outputs of the comparators 341 and 342 are coupled to the inputs of the NAND gates 343 and 344 respectively. The output of the comparator 344 is coupled to another input of the comparator 343, and the output of the comparator 343 is coupled to an input of the inverter 345. The output of the inverter 345 generates an oscillation signal CK. The switch 311 is controlled by the output of the inverter 346, and the switch 321 is controlled by the oscillation signal CK. The current $I_X$, $I_Y$, the control signal $V_{COM}$ and the capacitance of the capacitor 330 determine the frequency of the oscillation signal CK.

Figure 6:
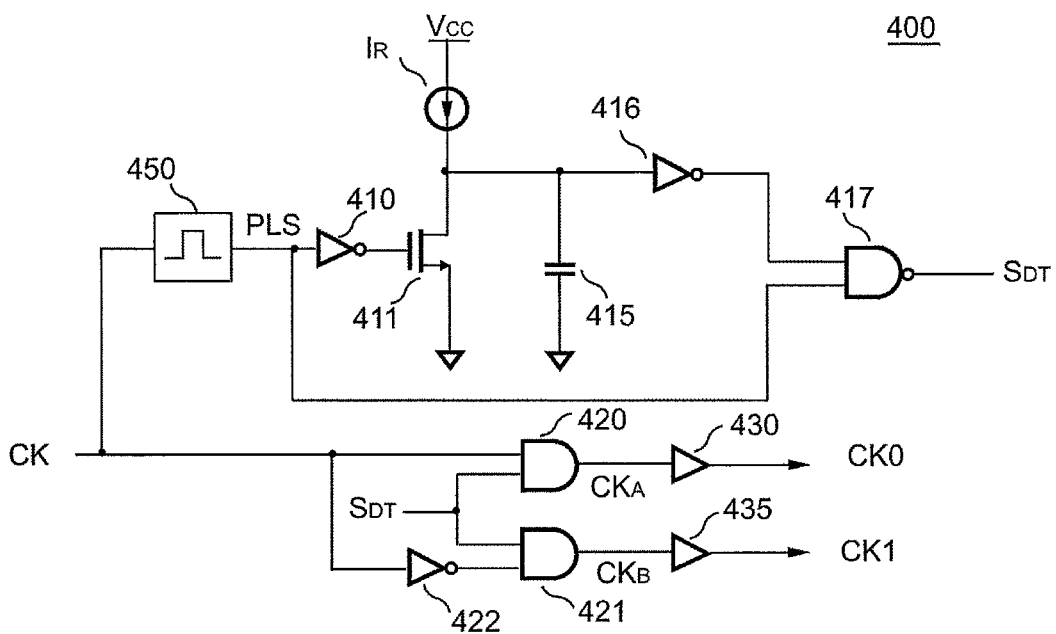
FIG. 6 shows a schematic diagram illustrating one embodiment of the dead-time circuit according to the present application.

FIG. 6 shows a schematic diagram illustrating one possible embodiment of the dead-time circuit 400 according to the present application. The dead-time circuit 400 comprises a pulse generator 450, a blanking-time circuit, AND gates 420 and 421, buffers 430 and 435, and an inverter 422. The pulse generator 450 is coupled to the blanking-time circuit, and generates a pulse signal PLS in response to the rising edge and falling edge of the oscillation signal CK. The pulse signal PLS is transmitted to the blanking-time circuit for producing a dead-time signal $S_{DT}$. The blanking-time circuit comprises a current source $I_R$, a capacitor 415, a transistor 411, inverters 410, 416 and an NAND gate 417. The current source $I_R$ is coupled to the drain of the transistor 411, the capacitor 415, and the input of the inverter 416. The output of the inverter 416 is coupled to the NAND gate 417. The input of the inverter 410 is also coupled to the NAND gate 417, and the output of the inverter 410 is coupled to the gate of the transistor 411. The AND gate 421 receives the oscillation signal CK via an inverter 422, and receives the dead-time signal $S_{DT}$ to generate a first switching signal CK0 through a buffer 430. The AND gate 420 receives the oscillation signal CK and the dead-time signal $S_{DT}$ to generate a second switching signal CK1 through a buffer 435.

Figure 7:
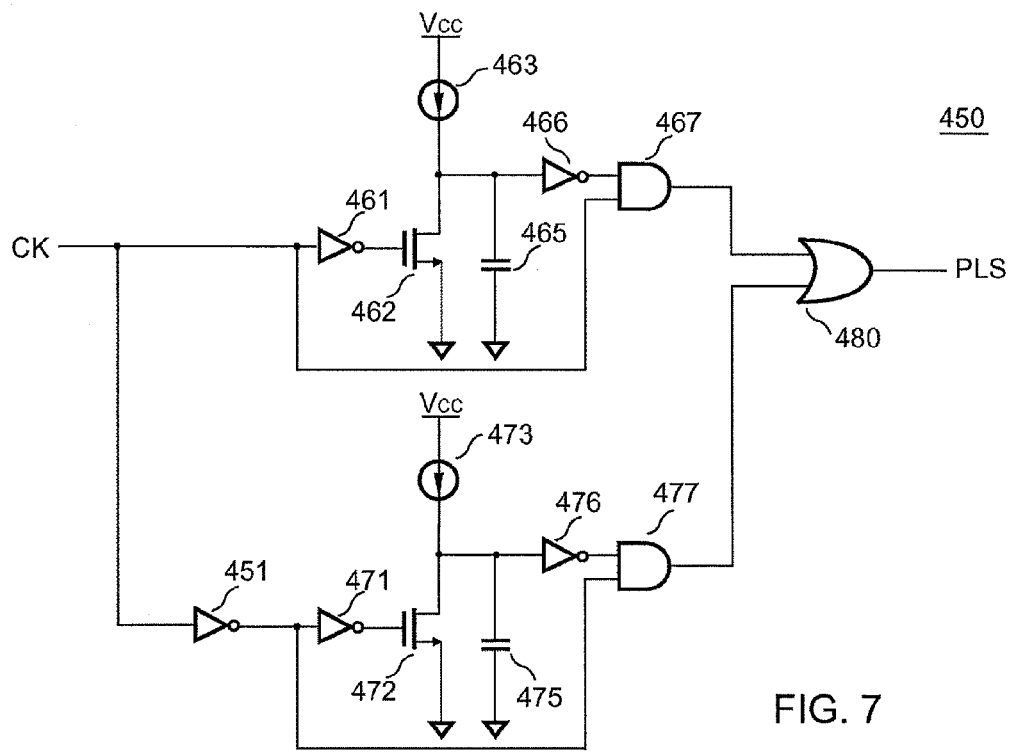
FIG. 7 shows a schematic diagram illustrating one embodiment of the pulse generator according to the present application.

FIG. 7 shows a schematic diagram illustrating one possible embodiment of the pulse generator 450 according to the present application. The pulse generator 450 comprises current sources 463 and 473, inverters 461, 466, 471, 476 and 451, transistors 462 and 472, AND gates 467 and 477, capacitors 465 and 475, and OR gate 480. The current source 463 is coupled to the drain of the transistor 462, the capacitor 465, and the input of the inverter 466. The output of the inverter 466 is coupled to the AND gate 467. The AND gate 467 receives the oscillation signal CK, and the output of the AND gate 467 is coupled to the OR gate 480. The current source 473 is coupled to the drain of the transistor 472, the capacitor 475, and the input of the inverter 476. The inverter 451 receives the oscillation signal CK, and the output of the inverter 451 is coupled to the input of the inverter 471 and the input of the AND gate 477. The output of the inverter 476 is also coupled to the AND gate 477. The input of the OR gate 480 is coupled to the outputs of the AND gates 467 and 477, and the pulse signal PLS is generated at the output of the OR gate 480.

Figure 8:
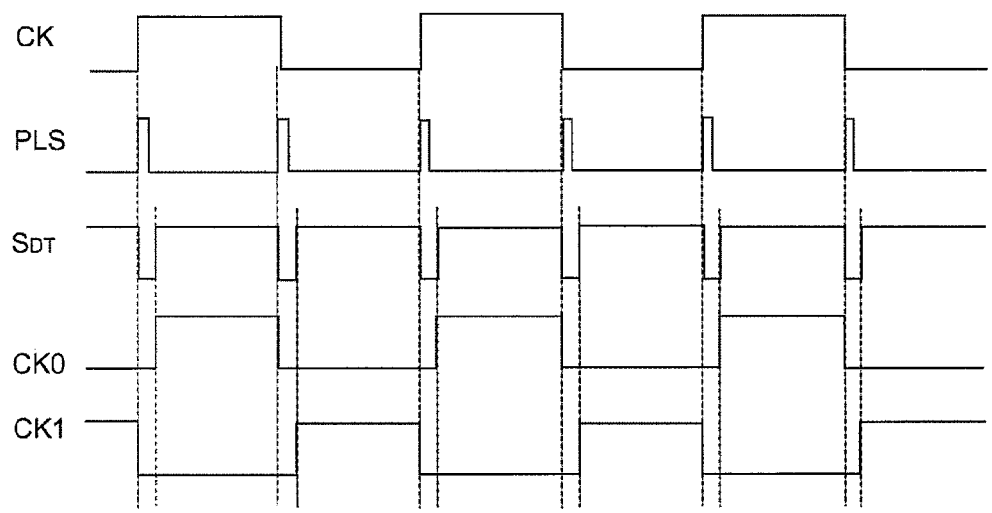
FIG. 8 shows waveforms of the oscillation signal CK, the pulse signal PLS, the dead-time signal SDT, and switching signals CK0 and CK1 according to the present application.

FIG. 8 shows waveforms of the oscillation signal CK, the pulse signal PLS, the dead-time signal $S_{DT}$, the first and second switching signals CK0 and CK1 according to the present application. The pulse signal PLS is generated at the rising edges and the falling edges of the oscillation signal CK. The dead-time signal $S_{DT}$ is off for a period when the pulse signal PLS is triggered. The first switching signal CK0 is on when both the dead-time signal $S_{DT}$ and the oscillation signal CK go high. The second switching signal CK1 is on when the dead-time signal $S_{DT}$ goes high and the oscillation signal CK goes low.

Figure 9:
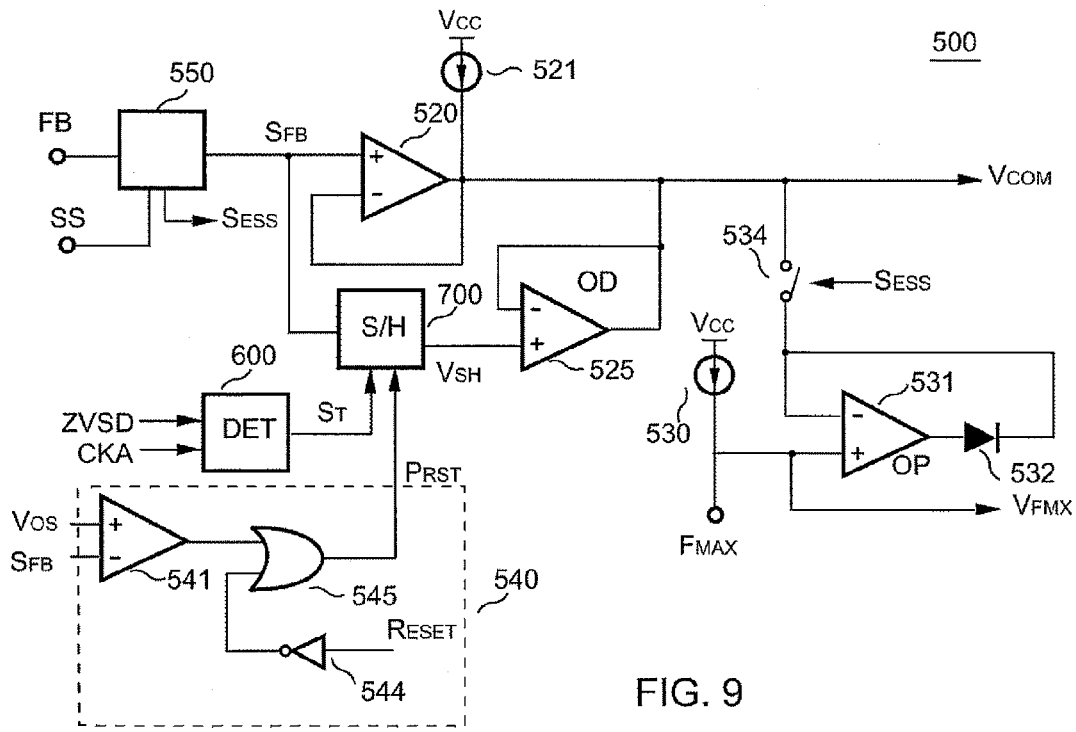
FIG. 9 shows a schematic diagram illustrating one embodiment of the input circuit according to the present invention.

FIG. 9 shows a schematic diagram illustrating one possible embodiment of the input circuit 500 according to the present invention. The input circuit 500 comprises a feedback-input circuit 550, a buffer 520, a current source 521, a sample-and-hold circuit 700 represented as S/H, an open-drain-output buffer 525, a detection circuit 600 represented as DET and a preset circuit 540. The input circuit 500 further comprises a current source 530, an operational amplifier 531, a diode 532 and a switch 534.

The feedback-input circuit 550 is coupled to the soft start terminal SS and the feedback terminal FB of FIG. 1 for generating an input signal $S_{FB}$ and an end-soft-start signal $S_{ESS}$. The input signal $S_{FB}$ is correlated to the feedback signal $V_{FB}$. The input signal $S_{FB}$ is coupled to the buffer 520 having an open-drain output for generating the control signal $V_{COM}$. The current source 521 is connected to the output of the buffer 520 for pulling high. The input signal $S_{FB}$ is further coupled to the sample-and-hold circuit 700 for clamping the maximum value of the control signal $V_{COM}$ through another open-drain-output buffer 525. The ZVS-detection signal ZVSD and the signal $CK_A$ are transmitted to the detection circuit 600 for generating a latch signal $S_T$ when a none-ZVS status is detected. The latch signal $S_T$ is transmitted to sample and hold a shifted-value of the input signal $S_{FB}$ in the sample-and-hold circuit 700, and generating a signal $V_{SH}$ coupled to the buffer 525. The preset-circuit 540 comprises a comparator 541, an OR gate 545 and an inverter 544. The preset circuit 540 receives the input signal $S_{FB}$ and an offset signal $V_{OS}$. The preset-circuit 540 comprises a comparator 541, an OR gate 545 and an inverter 544. The offset signal $V_{OS}$ is compared with a system-reset signal $R_{ESET}$ by a comparator 541, and is input into an OR gate 545. A preset signal $P_{RST}$ is generated through the OR gate 545 and is utilized to preset the value of the sample-and-hold circuit 700 and pull high the signal $V_{SH}$. The preset signal $P_{RST}$ is generated to preset the sample-hold circuit 700 when the input signal $S_{FB}$ is lower than the offset signal $V_{OS}$, or the system-reset signal $R_{ESET}$ is off during the power-on state.

The current source 530 is connected to the $F_{MAX}$ terminal. The current source 530 associated with the resistor 72 of FIG. 1 will generate the maximum frequency signal $V_{FMX}$. An operational amplifier 531 and a diode 532 develop a buffer circuit configured to receive the maximum frequency signal $V_{FMX}$ for clamping the minimum value of the control signal $V_{COM}$ through a switch 534. The switch 534 is enabled by the end-soft-start signal $S_{ESS}$.

Because the maximum value of the control signal $V_{COM}$ is clamped by the sample-and-hold circuit 700, the minimum frequency of the switching signals CK0 and CK1 are limited to prevent the switching frequency of the resonant converter operating in Region 3 in FIG. 2. Because the minimum value of the control signal $V_{COM}$ is clamped by the maximum-frequency signal $V_{FMX}$, the maximum frequency of the switching signals CK0, CK1 are controlled to be more efficient when the load of the power converter is light.

Figure 10:
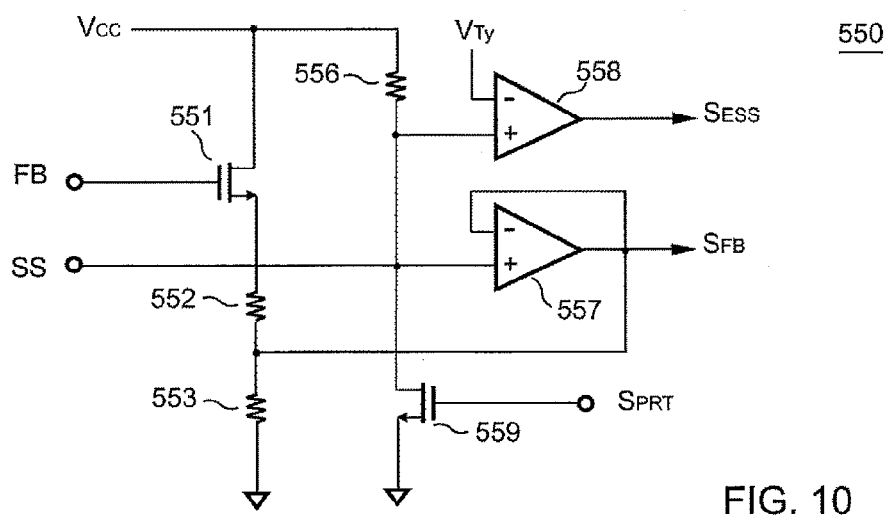
FIG. 10 shows a schematic diagram illustrating one embodiment of the feedback-input circuit according to the present invention.

FIG. 10 shows a schematic diagram illustrating one embodiment of the feedback-input circuit 550 according to the present invention. The feedback-input circuit 550 comprises a level-shift circuit, a buffer 557, a comparator 558, a transistor 559 and a resistor 556. The level-shift circuit developed by resistors 552, 553 and a transistor 551 is configured to receive the feedback signal $V_{FB}$ for generating the input signal $S_{FB}$. The buffer 557 having an open-drain output, is configured to clamp the value of the input signal $S_{FB}$ according to the voltage of the SS terminal. A positive input of the buffer 557 is coupled to the terminal SS for the soft-start, and is coupled to the resistor 556 and the transistor 559. The resistor 556 is coupled to the SS terminal and $V_{CC}$ to charge the capacitor 73 when the transistor 559 is off. A signal $S_{PRT}$ controls on/off states of the transistor 559. The signal $S_{PRT}$ is coupled to the gate of the transistor 559, and is enabled during a period and during a situation of the power converter. The comparator 558 is coupled to the SS terminal and generates the end-soft-start signal $S_{ESS}$ when the voltage of SS terminal is higher than a threshold $V_{TY}$.

Figure 11:
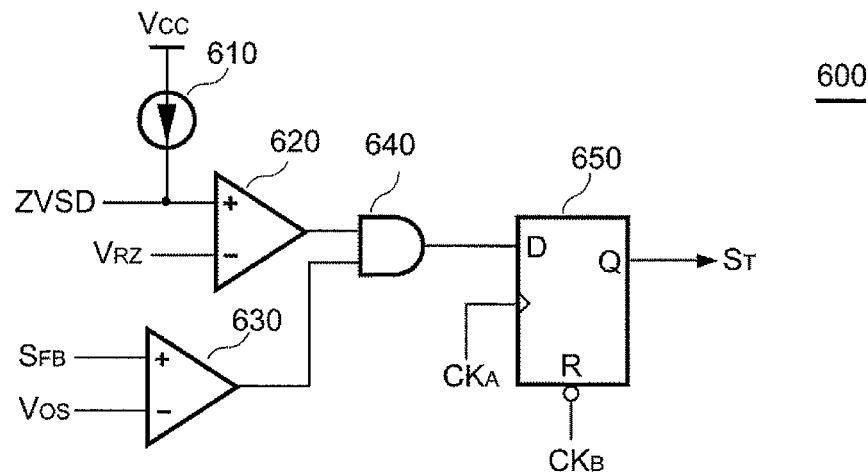
FIG. 11 shows a schematic diagram illustrating one embodiment of the detection circuit according to the present invention.

FIG. 11 shows a schematic diagram illustrating one embodiment of the detection circuit 600 according to the present invention. The detection circuit 600 comprises comparators 620 and 630, an AND gate 640, a D flip-flop 650, and a current source 610. The current source 610 is coupled to a positive input of the comparator 620 for receiving the ZVS-detection signal ZVSD. The comparator 620 outputs a logic-high signal (for none-ZVS state) when the ZVS-detection signal ZVSD is higher than a threshold $V_{RZ}$. Another comparator 630 also outputs a logic-high signal when the input signal $S_{FB}$ is higher than the offset signal $V_{OS}$. The input signal $S_{FB}$ higher than the offset signal $V_{OS}$ represents that the output load of the power converter is heavy. The outputs of comparators 620 and 630 are coupled to an AND gate 640. The output 640 is coupled to the D-input of a D-flip-flop 650 for generating the latch signal $S_T$. The clock-input the D-flip-flop 650 is driven by the signal $CK_A$. The reset-input of the D-flip-flop 650 is controlled by the signal $CK_B$. The zero-voltage switching (ZVS) state in a resonant power converter means that the body diode of the transistor is turned on by the circulated-current of the resonant tank before the transistor is switched on by a gate driving signal. Therefore, the latch signal $S_T$ will be generated (to indicate a none-ZVS state) if the body diode of the transistor 20 is not conducted before the transistor 20 is switched on.

Figure 12:
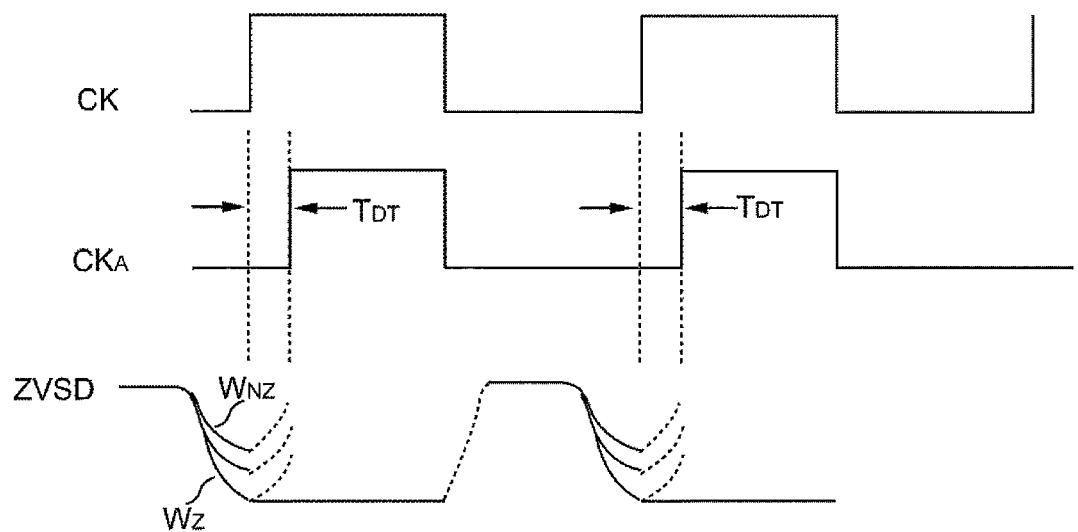
FIG. 12 shows waveforms of the oscillation signal CK, the signal $CK_A$ and the ZVS-detection signal ZVSD according to the present invention.

FIG. 12 shows waveforms of the oscillation signal CK, the signal $CK_A$ and the ZVS-detection signal ZVSD according to the present invention. After the oscillation signal CK is turned on for a dead-time period $T_{DT}$, the signal $CK_A$ goes high. The signal $CK_A$ is turned off when the oscillation signal CK goes low. A $W_Z$ waveform of the ZVS-detection signal ZVSD represents the ZVS state. The $W_{NZ}$ waveform of the ZVS-detection signal ZVSD represents the none-ZVS state. It is clearly shown that in the non-ZVS state, the ZVS-detection signal ZVSD does not go low before the dead-time period; and in the ZVS state, the ZVS-detection signal ZVSD already goes low before the dead-time period starts.

Figure 13:
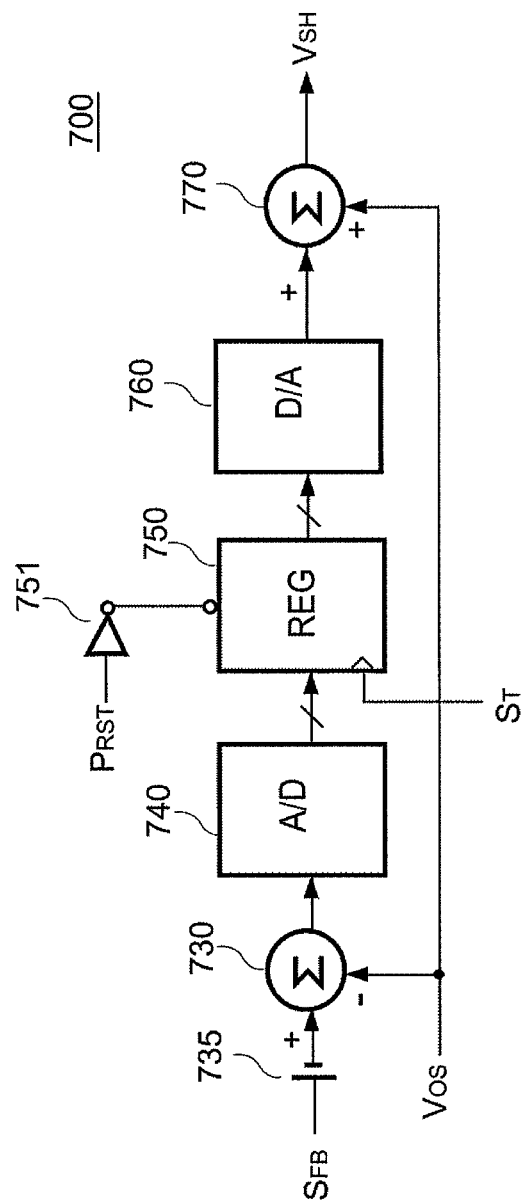
FIG. 13 shows a schematic diagram illustrating one embodiment of the sample-and-hold circuit according to the present invention.

FIG. 13 shows a schematic diagram illustrating one embodiment of the sample-and-hold circuit 700 according to the present invention. The sample-and-hold circuit 700 comprises adder circuits 730 and 770, an analog-to-digital converter (A/D) 740, a register (REG) 750, a digital-to-analog converter (D/A) 760, and an inverter 751. The input signal $S_{FB}$ is level shifted (decreased) by a reference level 735, and then is sent to a positive input of the adder-circuit 730. The offset signal $V_{OS}$ is transmitted to a negative input of the adder circuit 730. The output of the adder circuit 730 is coupled to the input of the analog-to-digital converter 740. In other words, the input signal $S_{FB}$ will be subtracted from the reference level 735 and the level of the offset signal $V_{OS}$, and then it is transmitted to the analog-to-digital converter 740. The output of the analog-to-digital converter 740 is transmitted to the register 750. The preset signal $P_{RST}$ is configured to preset the registers 750 via the inverter 751. The latch signal $S_T$ is configured to latch the output of the analog-to-digital converter 740 into the registers 750. The output of the registers 750 is coupled to the digital-to-analog converter 760. The output of the digital-to-analog converter 760 is added with the offset signal $V_{OS}$ through the adder-circuit 770 for generating the signal $V_{SH}$, which is the output of the sample-hold circuit 700.

According to the present invention, if a non-ZVS state is detected, the operation frequency of the transistors will be increased. Therefore, the resonant power converter is prevented from operating in a low frequency area like Region 3 in FIG. 2, and non-linear operation can be avoided.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A control circuit of a resonant power converter, comprising:
    a first transistor and a second transistor for switching a transformer and a resonant tank;
    a controller, correlated to an output of the resonant power converter, is configured to receive a feedback signal for generating a first switching signal and a second switching signal to drive the first transistor and the second transistor respectively;
    a diode coupled to the first transistor for detecting the state of the first transistor and generating a detection signal for the controller corresponding to the state of the first transistor;
    wherein the switching frequency of the first transistor and the second transistor is increased if a body diode of the first transistor is not conducted before the first switching signal turns on the first transistor.

2. The control circuit as claimed in claim 1, wherein the detection signal is enabled if the body diode of the first transistor is not conducted before the first switching signal turns on the first transistor, and the switching frequency of the first transistor and the second transistor is clamped as a minimum value when the detection signal is enabled.

3. The control circuit as claimed in claim 1, further comprises:
    a resistor coupled to the controller to determine a minimum value of the switching frequency; and
    another resistor coupled to the controller to determine a maximum value of the switching frequency.

4. The control circuit as claimed in claim 1, further comprising a capacitor coupled to the controller for soft start.

5. The control circuit as claimed in claim 1, wherein the controller further comprises:
    an input circuit configured to receive the feedback signal and the detection signal for generating a control signal; and
    an oscillator configured to receive the control signal for generating an oscillation signal;
    wherein the oscillation signal is correlated to generate the first switching signal and the second switching signal.

6. The control circuit as claimed in claim 5, wherein the input circuit comprises a sample-and-hold circuit to clamp the control signal under a maximum value when the detection signal is enabled.

7. The control circuit as claimed in claim 6, in which the sample-and-hold circuit further comprises:
    an analog-to-digital converter;
    a register coupled to the analog-to digital converter;
    a digital-to-analog converter coupled to the register.

8. A method for controlling a resonant power converter, which comprising:
    receiving a feedback signal, correlated to an output of the resonant power converter;
    generating a switching signal corresponding to the feedback signal;
    switching on a transformer and a resonant tank through a transistor corresponding to the switching signal;
    generating a detection signal indicating whether the body diode of the transistor is conducted or not before switching on the transformer and the resonant tank through the transistor;
    changing the switching frequency of the transistor corresponding to the detection signal;
    wherein the transistor is driven by the switching signal.

9. The method as claimed in claim 8, wherein generating a detection signal comprises enabling the detection signal when the body diode of the transistor is not conducted before the switching signal turns on the transistor.

10. The method as claimed in claim 8, wherein changing the switching frequency of the transistor corresponding to the detection signal comprises increasing the switching frequency when the detection signal is enabled.

11. The method as claimed in claim 8, in which the detection signal is generated from a diode coupled to detect the state of the transistor.

12. The method as claimed in claim 8, further comprises:
    programming a minimum switching frequency and a maximum switching frequency; and
    programming a soft start.

13. The method as claimed in claim 12, wherein programming a minimum switching frequency and a maximum switching frequency comprises programming a minimum switching frequency and a maximum switching frequency through resistors, and programming a soft start comprises programming a soft start through a capacitor.

14. The method as claimed in claim 8, wherein generating a switching signal comprising:
   generating a control signal corresponding to the feedback signal and the detection signal;
   generating an oscillation signal corresponding to the control signal;
   wherein the oscillation signal is coupled to generate the switching signal.

15. The method as claimed in claim 14, in which generating the control signal comprises clamping the control signal under a maximum value through a sample-and-hold circuit when the detection signal is enabled.

16. The method as claimed in claim 15, in which the sample-hold circuit comprising:
   an analog-to-digital converter;
   a register coupled to the analog-to-digital converter; and
   a digital-to-analog converter coupled to the register.

\* \* \* \* \*